(12) United States Patent
Hodges et al.

(10) Patent No.: US 8,606,929 B2
(45) Date of Patent: Dec. 10, 2013

(54) METHODS, SYSTEMS, AND PRODUCTS FOR SUBCONTRACTING SEGMENTS IN COMMUNICATIONS SERVICES

(75) Inventors: Donna K. Hodges, Cumming, GA (US); Barrett Morris Kreiner, Norcross, GA (US); Steven N. Tischer, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 198 days.

(21) Appl. No.: 12/334,578

(22) Filed: Dec. 15, 2008

(65) Prior Publication Data

US 2009/0100191 A1    Apr. 16, 2009

Related U.S. Application Data

(63) Continuation of application No. 10/720,949, filed on Nov. 24, 2003, now Pat. No. 7,467,219.

(51) Int. Cl.
*G06F 15/16* (2006.01)

(52) U.S. Cl.
USPC .................... 709/227; 709/231; 709/234

(58) Field of Classification Search
USPC ....................................................... 709/227
See application file for complete search history.

(56) References Cited

U.S. PATENT DOCUMENTS

| | | | |
|---|---|---|---|
| 4,788,721 A | 11/1988 | Krishnan et al. | |
| 4,873,517 A | 10/1989 | Baratz et al. | |
| 5,513,306 A * | 4/1996 | Mills et al. | 715/202 |
| 5,752,186 A | 5/1998 | Malackowski et al. | |
| 5,761,429 A | 6/1998 | Thompson | |
| 5,771,282 A | 6/1998 | Friedes | |
| 5,786,770 A | 7/1998 | Thompson | |
| 5,790,176 A | 8/1998 | Craig | |
| 5,838,913 A | 11/1998 | Lysejko et al. | |
| 5,862,325 A | 1/1999 | Reed et al. | |
| 5,862,471 A | 1/1999 | Tiedemann et al. | |
| 5,941,988 A * | 8/1999 | Bhagwat et al. | 726/12 |
| 5,970,121 A | 10/1999 | Homayoun | |
| 5,978,780 A | 11/1999 | Watson | |
| 6,002,689 A | 12/1999 | Christie | |
| 6,012,098 A | 1/2000 | Bayeh et al. | |

(Continued)

FOREIGN PATENT DOCUMENTS

WO    WO 00/41426    7/2000

OTHER PUBLICATIONS

Greene, William, "Sample selection in credit-scoring models", Mar. 31, 1998, Dept. of Econ, Stern School of Business, NYU, Elsevier Science, Japan and the World Economy, pp. 299-316.

(Continued)

*Primary Examiner* — Ario Etienne
*Assistant Examiner* — Blake Rubin
(74) *Attorney, Agent, or Firm* — Scott P. Zimmerman, PLLC (57) ABSTRACT

Methods, systems, and products are disclosed for providing communications services. One method receives a first data stream at a computer, with the first data stream comprising packets of data packetized according to a packet protocol. The first data stream is recursively segmented into segments, and at least one of the segments is dispersed via a network for a subsequent processing service. A result of the processing service is received, and the result is aggregated into a second data stream. The second data stream is then communicated via the network.

18 Claims, 9 Drawing Sheets

(56) References Cited

U.S. PATENT DOCUMENTS

| | | | |
|---|---|---|---|
| 6,016,307 A | 1/2000 | Kaplan et al. | |
| 6,018,359 A * | 1/2000 | Kermode et al. | 725/101 |
| 6,032,190 A * | 2/2000 | Bremer et al. | 709/238 |
| 6,058,301 A | 5/2000 | Daniels | |
| 6,088,717 A | 7/2000 | Reed et al. | |
| 6,104,718 A | 8/2000 | Christie | |
| 6,148,290 A | 11/2000 | Dan et al. | |
| 6,178,170 B1 | 1/2001 | Duree | |
| 6,226,291 B1 * | 5/2001 | Chauvel et al. | 370/392 |
| 6,236,642 B1 | 5/2001 | Shaffer et al. | |
| 6,263,358 B1 | 7/2001 | Lee et al. | |
| 6,272,343 B1 | 8/2001 | Pon et al. | |
| 6,278,446 B1 * | 8/2001 | Liou et al. | 715/700 |
| 6,285,871 B1 | 9/2001 | Daniels | |
| 6,363,434 B1 | 3/2002 | Eytchison | |
| 6,385,198 B1 | 5/2002 | Ofek et al. | |
| 6,405,257 B1 | 6/2002 | Gersht et al. | |
| 6,421,714 B1 | 7/2002 | Rai et al. | |
| 6,442,518 B1 * | 8/2002 | Van Thong et al. | 704/235 |
| 6,456,594 B1 | 9/2002 | Kaplan | |
| 6,487,600 B1 * | 11/2002 | Lynch | 709/229 |
| 6,516,194 B2 | 2/2003 | Hanson | |
| 6,519,627 B1 | 2/2003 | Dan et al. | |
| 6,519,693 B1 | 2/2003 | Debey | |
| 6,522,883 B2 | 2/2003 | Titmuss et al. | |
| 6,535,592 B1 | 3/2003 | Snelgrove | |
| 6,567,375 B2 | 5/2003 | Balachandran et al. | |
| 6,571,016 B1 * | 5/2003 | Mehrotra et al. | 382/236 |
| 6,606,502 B1 | 8/2003 | Chung Kam Chung et al. | |
| 6,621,801 B1 | 9/2003 | Wright et al. | |
| 6,697,806 B1 | 2/2004 | Cook | |
| 6,710,785 B1 * | 3/2004 | Asai et al. | 715/723 |
| 6,728,267 B1 | 4/2004 | Giese et al. | |
| 6,738,815 B1 | 5/2004 | Willis et al. | |
| 6,772,413 B2 * | 8/2004 | Kuznetsov | 717/136 |
| 6,789,126 B1 * | 9/2004 | Saulpaugh et al. | 709/245 |
| 6,836,465 B2 | 12/2004 | Rajan et al. | |
| 6,836,652 B2 | 12/2004 | Arima et al. | |
| 6,856,963 B1 | 2/2005 | Hurwitz | |
| 6,901,446 B2 | 5/2005 | Chellis et al. | |
| 6,917,628 B2 | 7/2005 | McKinnin et al. | |
| 6,934,530 B2 | 8/2005 | Engelhart | |
| 6,950,847 B2 | 9/2005 | Harrisville-Wolff et al. | |
| 6,957,226 B2 | 10/2005 | Attias | |
| 6,961,893 B1 | 11/2005 | Mukund et al. | |
| 6,978,308 B2 | 12/2005 | Boden et al. | |
| 6,980,555 B2 * | 12/2005 | Mar | 370/395.21 |
| 7,043,225 B1 | 5/2006 | Patel et al. | |
| 7,065,496 B2 | 6/2006 | Subbloie et al. | |
| 7,155,517 B1 | 12/2006 | Koponen | |
| 7,184,548 B2 | 2/2007 | Wee et al. | |
| 7,191,232 B2 * | 3/2007 | Rigori et al. | 709/226 |
| 7,191,241 B2 * | 3/2007 | Boucher et al. | 709/230 |
| 7,249,055 B1 | 7/2007 | Elder | |
| 7,289,489 B1 | 10/2007 | Kung et al. | |
| 7,334,039 B1 * | 2/2008 | Majkut et al. | 709/229 |
| 7,343,416 B2 | 3/2008 | Hodges et al. | |
| 7,577,582 B1 | 8/2009 | Ojha et al. | |
| 8,031,598 B2 | 10/2011 | Beshai et al. | |
| 2001/0005358 A1 | 6/2001 | Shiozawa | |
| 2001/0014210 A1 * | 8/2001 | Kang | 386/96 |
| 2001/0029544 A1 | 10/2001 | Cousins | |
| 2001/0056504 A1 * | 12/2001 | Kuznetsov | 709/310 |
| 2002/0021669 A1 | 2/2002 | Kunito et al. | |
| 2002/0058532 A1 | 5/2002 | Snelgrove et al. | |
| 2002/0073182 A1 | 6/2002 | Zakurdauv et al. | |
| 2002/0087674 A1 | 7/2002 | Guilford | |
| 2002/0106019 A1 * | 8/2002 | Chaddha et al. | 375/240.02 |
| 2002/0112060 A1 | 8/2002 | Kato | |
| 2002/0120744 A1 | 8/2002 | Chellis et al. | |
| 2002/0128948 A1 | 9/2002 | Wiesehuegel et al. | |
| 2002/0138398 A1 | 9/2002 | Kalin et al. | |
| 2002/0138418 A1 | 9/2002 | Zarin et al. | |
| 2002/0146102 A1 | 10/2002 | Lang | |
| 2002/0161908 A1 * | 10/2002 | Benitez et al. | 709/231 |
| 2002/0164018 A1 * | 11/2002 | Wee et al. | 380/37 |
| 2002/0176378 A1 | 11/2002 | Hamilton | |
| 2003/0004855 A1 | 1/2003 | Dutta et al. | |
| 2003/0005103 A1 * | 1/2003 | Narad et al. | 709/223 |
| 2003/0005154 A1 | 1/2003 | Thurman | |
| 2003/0005155 A1 | 1/2003 | Carbonell et al. | |
| 2003/0012136 A1 * | 1/2003 | Walles | 370/229 |
| 2003/0012376 A1 * | 1/2003 | Wee et al. | 380/200 |
| 2003/0033238 A1 | 2/2003 | Oskielunas et al. | |
| 2003/0043815 A1 | 3/2003 | Tinsley | |
| 2003/0051054 A1 | 3/2003 | Redllich et al. | |
| 2003/0055723 A1 | 3/2003 | English | |
| 2003/0088778 A1 | 5/2003 | Lindqvist | |
| 2003/0093550 A1 * | 5/2003 | Lebizay et al. | 709/236 |
| 2003/0093790 A1 | 5/2003 | Logan et al. | |
| 2003/0097462 A1 * | 5/2003 | Parent et al. | 709/236 |
| 2003/0100315 A1 | 5/2003 | Rankin | |
| 2003/0105726 A1 | 6/2003 | Itoh et al. | |
| 2003/0126610 A1 | 7/2003 | Ando | |
| 2003/0143978 A1 | 7/2003 | Cooper et al. | |
| 2003/0156543 A1 | 8/2003 | Sahinoglu et al. | 370/238 |
| 2003/0200336 A1 * | 10/2003 | Pal et al. | 709/246 |
| 2003/0211856 A1 | 11/2003 | Zilliacus | |
| 2003/0225677 A1 | 12/2003 | Sandholm et al. | |
| 2003/0233332 A1 | 12/2003 | Keeler et al. | |
| 2004/0008778 A1 * | 1/2004 | Yang et al. | 375/240.16 |
| 2004/0019900 A1 | 1/2004 | Knightbridge et al. | |
| 2004/0028049 A1 * | 2/2004 | Wan | 370/394 |
| 2004/0030681 A1 * | 2/2004 | Shannon et al. | 707/3 |
| 2004/0073701 A1 * | 4/2004 | Huang et al. | 709/240 |
| 2004/0132449 A1 | 7/2004 | Kowarsch | |
| 2004/0139208 A1 | 7/2004 | Tuli | |
| 2004/0151382 A1 * | 8/2004 | Stellenberg et al. | 382/219 |
| 2004/0160932 A1 | 8/2004 | Yegoshin | |
| 2004/0205013 A1 | 10/2004 | DeLaCruz | |
| 2004/0218895 A1 * | 11/2004 | Samadani et al. | 386/46 |
| 2004/0220965 A1 * | 11/2004 | Harville et al. | 707/104.1 |
| 2004/0221053 A1 | 11/2004 | Codella et al. | |
| 2004/0249927 A1 | 12/2004 | Pezutti | |
| 2004/0252681 A1 * | 12/2004 | Rabipour et al. | 370/360 |
| 2004/0267686 A1 | 12/2004 | Chayes et al. | |
| 2005/0025124 A1 | 2/2005 | Mitsumori et al. | |
| 2005/0038637 A1 | 2/2005 | Balakrishnan et al. | |
| 2005/0060420 A1 | 3/2005 | Kovacevic | |
| 2005/0094725 A1 | 5/2005 | Hui | |
| 2005/0102135 A1 * | 5/2005 | Goronzy et al. | 704/213 |
| 2005/0183127 A1 * | 8/2005 | Ngo et al. | 725/90 |
| 2006/0031515 A1 | 2/2006 | VanGassel et al. | |
| 2006/0041679 A1 | 2/2006 | Feig | |
| 2006/0058010 A1 | 3/2006 | Williams et al. | |
| 2006/0206619 A1 | 9/2006 | Dan et al. | |
| 2007/0112948 A1 | 5/2007 | Uhlik | |
| 2007/0192862 A1 * | 8/2007 | Vermeulen et al. | 726/23 |
| 2007/0203844 A1 | 8/2007 | Kuhn et al. | |
| 2007/0226118 A1 | 9/2007 | Gill | |
| 2007/0299771 A1 | 12/2007 | Brody et al. | |

OTHER PUBLICATIONS

O'Connell, Brian, "Around the World With Global Network", Oct. 1993, DEC Professional, v12, No. 10, p. 38(6).

* cited by examiner

METHODS, SYSTEMS, AND PRODUCTS FOR SUBCONTRACTING SEGMENTS IN COMMUNICATIONS SERVICES

CROSS-REFERENCE TO RELATED APPLICATIONS

This application is a continuation of U.S. application Ser. No. 10/720,949, filed Nov. 24, 2003, now issued as U.S. Pat. No. 7,467,219, and incorporated herein by reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to computers and to communications and, more particularly, to processing data in a communications network.

2. Description of the Related Art

Manipulation of electronic data is important in computer networking and in communications. Often times electronic data must be manipulated for presentation at a client communications device. That is, the electronic data must be changed, formatted, or altered to suit the display characteristics, processing abilities, and/or storage capabilities of the client communications device. A handheld personal data assistant, for example, often requires that bandwidth-intensive electronic data, such as on-demand video, be scaled, color corrected, and/or otherwise manipulated for optimum presentation on the small display of the handheld personal data assistant. Heretofore, however, manipulation of electronic data was usually the responsibility of the client communications device—that is, the client communications device stores and utilizes one or more computer programs to manipulate incoming electronic data for presentation on the client communications device.

Locally manipulating electronic data, however, poses problems. As the electronic data is received, the client communications device must store the electronic data, process/manipulate the electronic data, and present the manipulated electronic data to the user. This process of storing, manipulating, and/or presenting the electronic data, however, often taxes the limited processing and storage capabilities of the client communications device. As both those skilled and unskilled recognize, when the processing and/or storage capabilities of the client communications device are overwhelmed, the audio/video presentation may "stumble" and degrade the user experience. Sometimes the client communications device even experiences a fault or failure when the processing and/or storage capabilities are overwhelmed. There is, accordingly, a need in the art for methods and systems of manipulating electronic data that reduce the need for locally-stored computer programs and that reduce the need for local processing requirements.

BRIEF SUMMARY OF THE INVENTION

The aforementioned problems, and other problems, are reduced by a Analysis Module. This Analysis Module comprises methods, computer systems, computer programs, and computer program products that provide communications services to subscribers. The Analysis Module recursively segments a stream of electronic data. The term "recursively segments" means the Analysis Module uses a characteristic of one segment to determine the segmentation of another segment. That is, when the Analysis Module segments the stream of electronic data, the segmentation of at least one segment is at least in part based upon a characteristic of a preceding segment. As this patent will further describe, these characteristics may include mathematical characteristics, content characteristics, timing characteristics, structural characteristics, processing characteristics, and routing characteristics.

Once a segment is created, that segment may be processed. Each individual segment, if required, is routed to one or more devices and/or other software transformation modules, within and without the communications network, for subsequent processing. When the subsequent processing is complete, the Analysis Module aggregates the result of the subsequent processing. The Analysis Module may then assemble that result into another data structure, and/or the Analysis Module may communicate the aggregated result along the communications network. The Analysis Module, for example, may assemble segments and results into a new, formatted data stream, and then communicate that formatted data stream to a client communications device. The client communications device may then view/execute/present the formatted data stream with little or no regard for the original format of the electronic data. That is, the aggregated results have already been substantially formatted, transformed, processed, and/or manipulated to suit the processing, storage, and/or audio/display requirements of the client communications device.

Because this invention utilizes recursive segmentation, this invention is particularly useful for structured streams of data. The technique of recursive segmentation, as described herein, lends itself to fast and efficient data compression, data description, and data prediction. As data content formats become more structured, this invention allows automated segmentation, automated processing, and automated assembly of streams of data. The Analysis Module of this invention creates and assembles formatted data streams for a client communications device. The client communications device may then view/execute/present the formatted data stream with little or no regard for the original format of the requested electronic data. The formatted, data stream has already been substantially formatted, transformed, processed, and/or manipulated to suit the processing, storage, and/or audio/display requirements of the client communications device.

This invention discloses methods, systems, and products for providing communications services. One of the embodiments describes a method for providing communications services. A first data stream is received at a computer, with the first data stream comprising packets of data packetized according to a packet protocol. The first data stream is recursively segmented into segments, and at least one of the segments is dispersed via a network for a subsequent processing service. A result of the processing service is received, and the result is aggregated into a second data stream. The second data stream is then communicated via the network.

Another of the embodiments describes another method for providing communications services. Here data is received at a computer, and the data is received as packets of data packetized according to a packet protocol. The packets of data are recursively segmenting into segments according to a segmentation profile stored in memory. At least one of the segments is dispersing via a network for a subsequent processing service. Results of the subsequent processing service are received and assembled into a data stream. The data stream includes at least one of i) the results of the subsequent processing service and ii) a recursively segmented segment. The assembled data stream may then be communicated via the network to another computer device and/or to a client communications device.

Other embodiments of this invention describe a system for providing communications services. An Analysis Module is stored in a memory device, and a processor communicates with the memory device. The Analysis Module receives data at a computer, with the data received as packets of data packetized according to a packet protocol. The Analysis Module recursively segments the packets of data into segments according to a segmentation profile stored in memory. The Analysis Module disperses at least one of the segments via a network for a subsequent processing service. The Analysis Module receives results of the subsequent processing service and assembles a data stream, with the data stream comprising at least one of i) the results of the subsequent processing service and ii) a recursively segmented segment.

Other embodiments of this invention describe a computer program product. A computer-readable medium stores an Analysis Module. The Analysis Module receives data at a computer, and the data is received as packets of data packetized according to a packet protocol. The Analysis Module recursively segments the packets of data into segments according to a segmentation profile stored in memory. The Analysis Module disperses at least one of the segments via a network for a subsequent processing service. The Analysis Module receives results of the subsequent processing service and assembles a data stream, with the data stream comprising at least one of i) the results of the subsequent processing service and ii) a recursively segmented segment.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

These and other features, aspects, and advantages of the embodiments of the present invention are better understood when the following Detailed Description of the Invention is read with reference to the accompanying drawings, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

Figure 1:
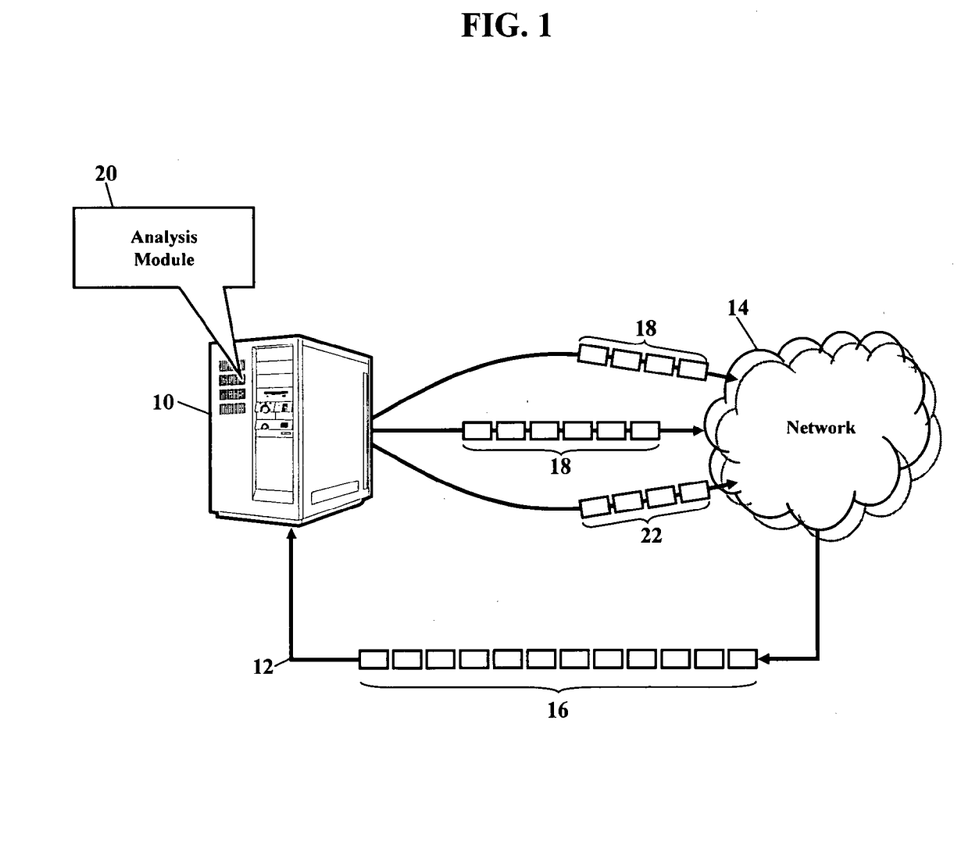
FIGS. 1 and 2 are simplified schematics illustrating one or more embodiments of this invention.
Figure 2:
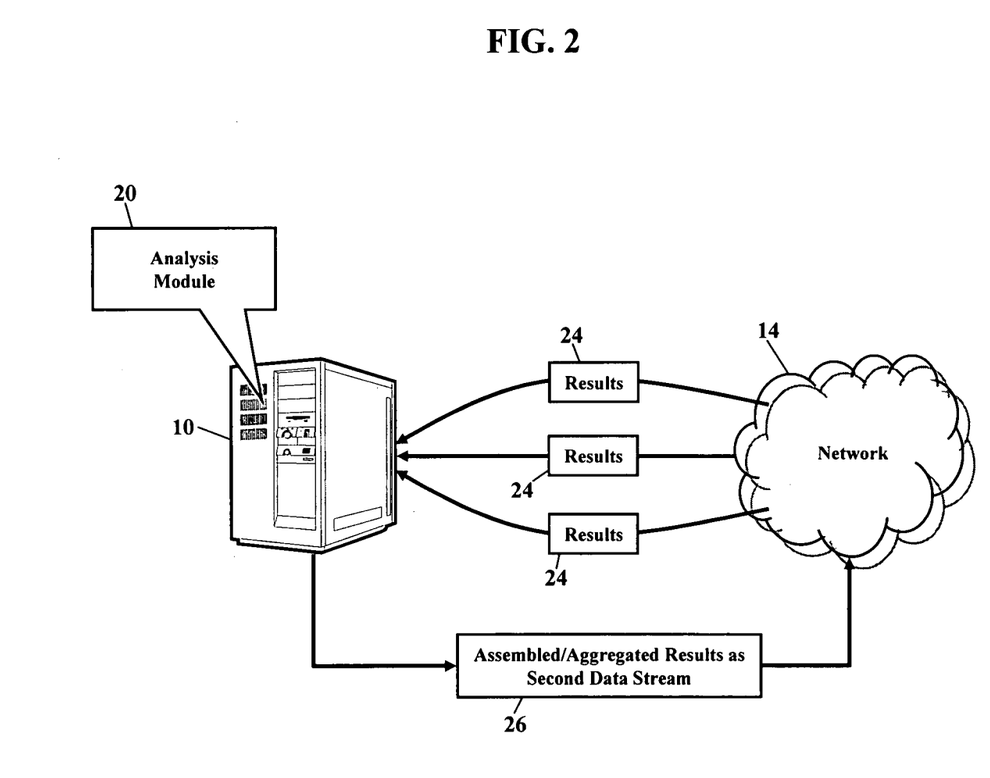

FIGS. 1 and 2 are simplified schematics illustrating this invention. The embodiments of this invention include an Analysis Module 20. The Analysis Module 20 comprises methods, systems, computer programs, and/or computer program products that help provide communications services. The Analysis Module 20 operates within a computer 10. The computer 10 receives a first stream 12 of data via a network 14. The first stream 12 of data typically includes individual packets 16 of information. The first stream 12 of data may have an XML (eXtensible Mark-up Language) format or a non-XML format. As FIG. 1 shows, the Analysis Module 20 acts upon the first stream 12 of data by segmenting the individual packets 16 into segments 18. The individual packets 16 may be segmented according to a similar characteristic and/or according to similar processing services. Some examples of these similar characteristics and/or similar processing services could include scaling requirements, color requirements, and network routing requirements. Some individual packets, for example, might require a scaling correction factor to achieve a "quality of presentation" objective at a smaller/larger display size. Those packets 16 that require this scaling correction factor are grouped into a segment. Some individual packets might require color correction to achieve that "quality of presentation" objective at a smaller/larger display size. These individual packets requiring color correction are, similarly, grouped into a segment. Some individual packets 18 may be recursively segmented into segments 18. The terms "recursively segments," "recursive segmentation," "recursively segmenting," and similar wording mean the Analysis Module 20 uses a characteristic of one segment to determine the segmentation of another segment. That is, when the Analysis Module 20 segments the first stream 12 of data, the segmentation of at least one segment 18 is at least in part based upon a characteristic of a preceding segment 22, as the following paragraphs will explain in greater detail. Some examples of these similar characteristics include recursively segmenting according to some mathematical characteristic of a preceding segment, recursively segmenting according to a characteristic of the content/structure of a preceding segment, and/or recursively segmenting according to a characteristic of the timing/sequence of a preceding segment. Once a segment is created, if the segment requires subsequent processing, the Analysis Module 20 then disperses that segment 18 and/or 22 via the network 14 for the subsequent processing service. The Analysis Module 20 routes the segments 18, 22 to other devices and/or locations via the network 14, and the subsequent processing service is performed.

The Analysis Module 20 may subcontract services to different service providers. If a different service provider can provide some requested communications service for a cheaper price, a higher performance, or some other criteria, then the Analysis Module 20 may determine that it's more profitable and/or more advantageous to "subcontract" some or all of the requested communications service. So, when a client communications device request some communications service for the first stream 12 of data, the Analysis Module 20 may interrogate other service providers. The Analysis Module 20 may dynamically, and in real-time, assess an availability of other communications networks operated by other service providers. The Analysis Module 20 may send an interrogation to the other service providers of the other communications networks. The interrogation describes what data is requested, and the interrogation includes any parameters for fulfilling a request for communications. The interrogation also solicits the other service provider's available network routing, available bandwidth, and pricing.

As FIG. 2 shows, the Analysis Module 20 receives the results 24 of the subsequent processing services. When the subsequent processing service is complete, the Analysis Module 20 aggregates the result(s) 24 of the subsequent processing service(s). The Analysis Module 20 may then assemble that result 24 into another data structure, and/or the Analysis Module 20 may communicate the result(s) 24 along the communications network 14. The Analysis Module 20, for example, may assemble unprocessed segments and the results 24 into a new, formatted, second data stream 26. As FIG. 2 shows, the second data stream 26 is typically communicated via the network 14 to another destination. That is, the second data stream 26 may be communicated to another computer device, and/or the second data stream 26 may be communicated to a client communications device. The client communications device may then view/execute/present the second data stream 26 with little or no regard for the original format of the electronic data. The second data stream 22, in other words, has already been substantially formatted, transformed, processed, and/or manipulated to suit the processing, storage, and/or audio/display requirements of the client communications device. The second data stream 26 may, instead, be communicated to a resident application/processor operating in the computer system 10.

Many characteristics may influence the recursive segmentation of a segment 18. The terms "recursively segments," "recursive segmentation," "recursively segmenting," and other similar wording mean that the Analysis Module 20 uses a characteristic of one segment to determine the segmentation of another segment. When the Analysis Module segments the first stream 12 of data, the segmentation of at least one segment 18 is at least in part based upon a characteristic of one or more preceding segments 22. One segment, for example, may be mathematically described from knowing the structure, content, or internal packet sequence of a preceding segment. If, for example, a sequence of packets has a similar structure to a previous sequence, then the corresponding segments may also have a similar structure. If the content of one or more segments resembles some previous segment(s), then the corresponding segments could have similar content. A known chronological characteristic of one segment may be used when segmenting other packets with the same chronological characteristic. As the following paragraphs suggest, any similarities between segments may be exploited for compression, description, and prediction algorithms.

The Analysis Module 20 may be used for data compression. When a segment shares a similar characteristic with a previous segment, the Analysis Module 20 may autonomously decide that the similar segments may be similarly compressed. As those of ordinary skill in the art understand, data compression is commonly used to reduce the size of data files. The Analysis Module 20 may similarly utilize data compression techniques to reduce the size, or length, of segments. The Analysis Module 20, in addition, may identify similar segments and "insert" similar compression results without actually compressing each similar segment. Static "background" scenes in a video, for example, may not change for several seconds or even several minutes. Once the Analysis Module 20 recognizes a repetitive segment, the Analysis Module 20 may substitute the data compression results of a similar, preceding segment. This ability to substitute, or "insert," compression results from a preceding segment allows the Analysis Module 20 to reduce, or even eliminate, processing of redundant segments. The Analysis Module 20 quickly substitutes compression results for similar segments, thus improving system and processor performance.

The Analysis Module 20 may be used for data description. If a segment shares a similar characteristic with a previous segment, then the Analysis Module 20 may autonomously decide that the similar segments may be similarly described. That is, once a segment is identified, other segments, having the same characteristic, may be similarly identified. Similar segments, in fact, may be abbreviated or referenced using a common descriptor, designation, and/or formula. This similar characteristic would permit similar segments to be replaced with a simpler, and/or shorter, notation. Long segments, and/or complex segments, for example, could be replaced with a short notation or with a shorter segment. If the actual segment is later required, the shorter notation (or shorter segment) may be replaced with the actual segment. The common descriptor, designation, formula, notation, and/or segment, representing similar segments, allows the Analysis Module 20 to reduce long and/or complicated data segments with shorter and simpler representations.

The Analysis Module 20 may also be used for data prediction. If a segment shares a similar characteristic with a previous segment, then the Analysis Module 20 may autonomously predict that the similar segment should have similar processing. The Analysis Module 20, for example, could discard, or "skip," any processing requirement for a segment having one or more the similar characteristics to a preceding segment. The Analysis Module 20, instead, could simply duplicate the processing results of the preceding segment. These duplicate processing results could then be assembled, or "inserted," at the appropriate moment or at the appropriate location. This similar characteristic between the segments allows the Analysis Module 20 to conserve, and perhaps eliminate, redundant processing requirements for similar segments.

The Analysis Module 20 may also be used for encryption of segments. Once a segment is encrypted, other segments with a similar characteristic may be similarly encrypted. That is, if a segment shares a similar characteristic with a previous segment, then the Analysis Module 20 may autonomously encrypt the similar segment as the preceding segment. Once the Analysis Module 20 recognizes a repetitive segment, the Analysis Module 20 may substitute the encryption results of a preceding segment. The Analysis Module 20 allows the same, or similar, encryption results from a preceding segment to be substituted for a current segment. The Analysis Module 20 again reduces, or even eliminates, processing of redundant segments. The Analysis Module 20 quickly substitutes encryption results for similar segments, thus improving system and processor performance.

Figure 3:
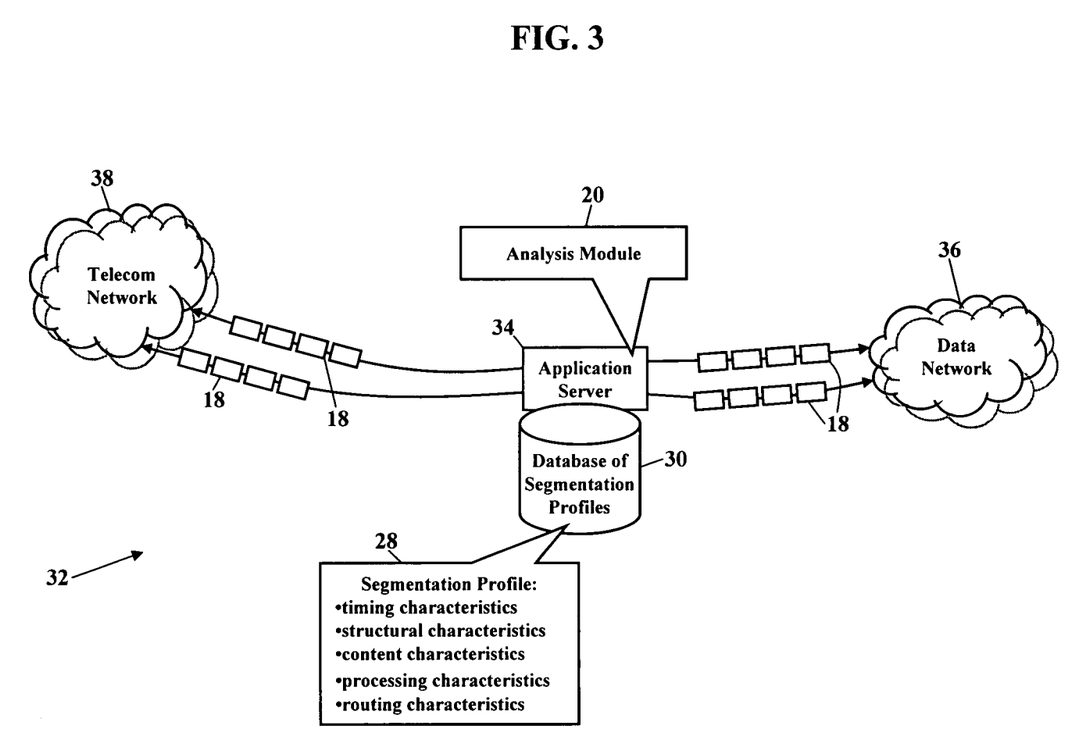
FIG. 3 is a schematic illustrating a segmentation profile according to another of the embodiments of this invention.

Because there may be many similarities between segments, FIG. 3 shows a segmentation profile 28. The Analysis Module 20 may consult the segmentation profile 28 when processing segments with similar characteristics. The segmentation profile 28 stores rules that define various actions when a similar characteristic is encountered. The segmentation profile 28 is stored/maintained in a database 30 of segmentation profiles. The database 30 of segmentation profiles may be stored/maintained at any location, and/or on any device, within a communications/communications/computer network 32. The segmentation profile 28 could also be stored on the client communications device. FIG. 3, however, shows the database 30 of segmentation profiles operating within, or locally to, an application server 34. The database 30 of segmentation profiles is stored within a system memory device of the application server 34.

Figure 9:
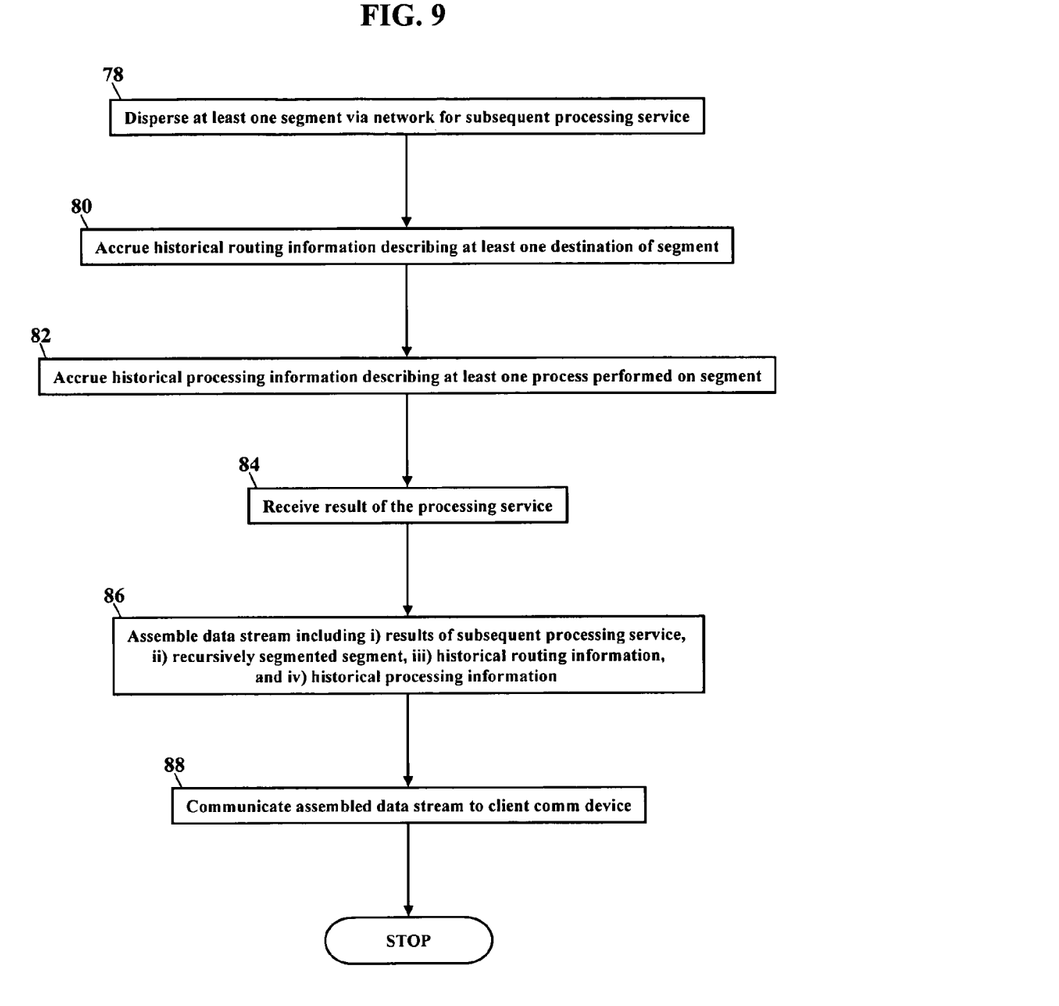

The Analysis Module 20 consults the segmentation profile 28. The segmentation profile 28 specifies how certain types of data and/or segments should be processed. The segmentation profile 28 may also specify how that data should be segmented. As the Analysis Module 20 segments data, the Analysis Module 20 consults the segmentation profile 28 for identified characteristics. If a segment contains a recognized characteristic, the Analysis Module 20 applies the rules stored within the segmentation profile 28. As FIG. 9 shows, the segmentation profile 28 stores various characteristics and associated factors, rules, requirements, and/or objectives that determine how similar segments should be processed. These characteristics may include timing characteristics, structural characteristics, content characteristics, processing characteristics, routing characteristics, and any other characteristics desired. The segmentation profile 28, for example, may specify that the processing of repetitive MPEG segments be suspended and, instead, processing results from an earlier segment be used (those of ordinary skill in the art of programming and communications are assumed familiar with the "Moving Picture Experts Group" family of International Standards for coding audio-visual information in a digital compressed format, e.g., MPEG-1, MPEG-2 and MPEG-4). The segmentation profile 28 might specify that any XML segment having five percent (5%) or less pixel data change within two seconds be discarded to reduce processing times. The segmentation profile 28 might specify that 128-bit audio segments be "chopped" to suit the limited, reduced fidelity abilities of a client communications device. Video segments, too, might be chopped/compressed/resized to suit the display characteristics of a client communications device. The segmentation profile 28 would generally list each characteristic and provide a rule, requirement, or objective for each characteristic. As the Analysis Module 20 encounters each characteristic, the Analysis Module 20 abides by the rule, requirement, or objective. If any segments then require subsequent processing service(s), the Analysis Module 20 disperses the segments 18 via a data network 36 and/or a communications network 38.

Figure 4:
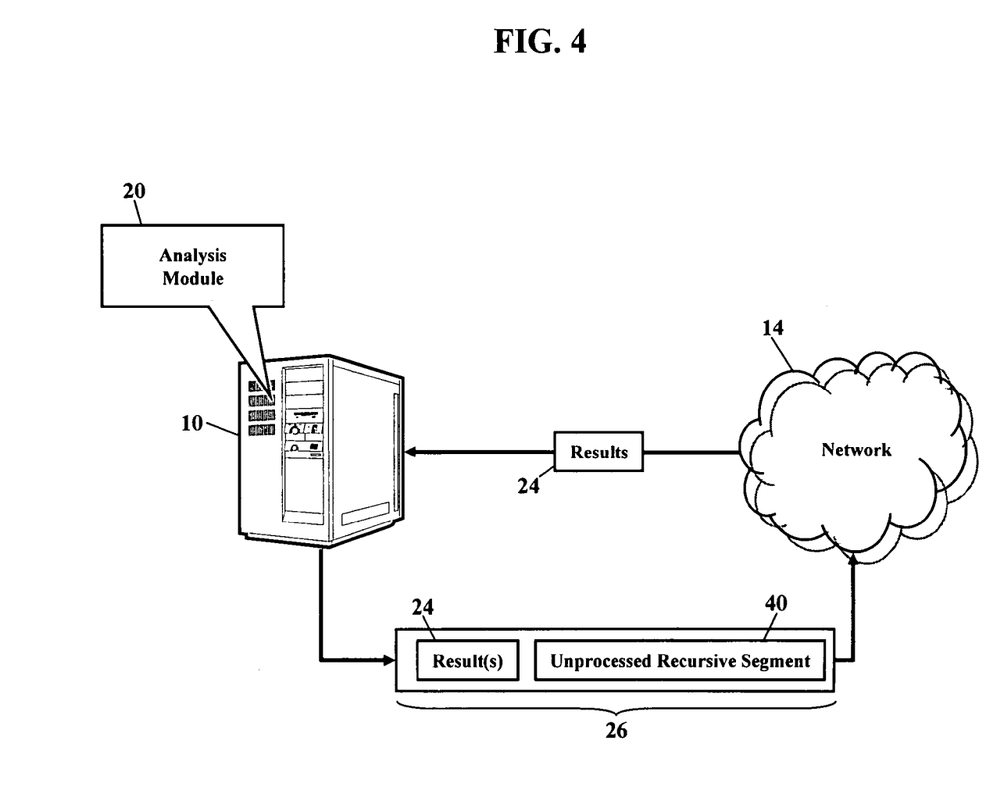
FIG. 4 is a schematic illustrating the assemblage of segments and/or processing results according to more embodiments of this invention.

FIG. 4 is a schematic illustrating another of the embodiments of this invention. FIG. 4 shows that the segmentation profile 28 may specify how various segments and/or results are assembled. As this patent earlier mentioned, the Analysis Module 20 receives the results 24 of the subsequent processing services. The Analysis Module 20 may then aggregate/assemble the second data stream 26. The second data stream 26 includes at least one of i) the results 24 of the subsequent processing service and ii) an unprocessed, recursively segmented segment 40. The Analysis Module 20 may then communicate the second data stream 26 along the data network 36 and/or the communications network 38 to another computer device and/or a client communications device. The second data stream 26 is preferably formatted such that the client communications device may view/execute/present the second data stream 26 with little or no regard for the original format of the first stream of data (shown as reference numeral 12 in FIG. 1). The second data stream 26, in other words, has already been substantially formatted, transformed, processed, and/or manipulated to suit the processing, storage, and/or audio/display requirements of the computer device and/or the client communications device.

Figure 5:
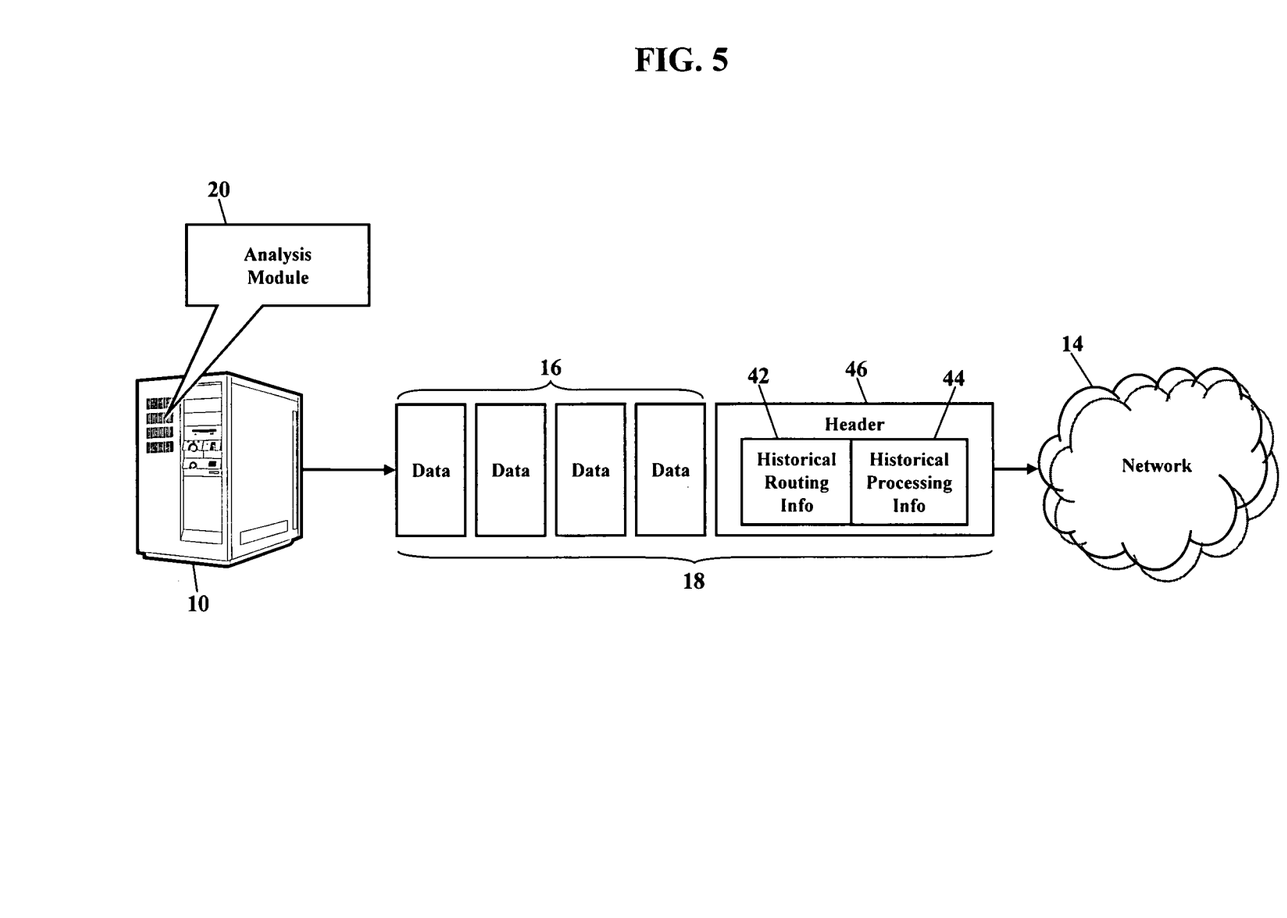
FIGS. 5 and 6 are schematics illustrating a segment containing historical routing information and historical processing information according to still more embodiments of this invention.

FIG. 5 is a schematic illustrating another of the embodiments of this invention. FIG. 5 shows an individual segment 18 containing historical routing information 42 and historical processing information 44. As each segment 18 travels, each segment 18 may accrue the historical routing information 42 and/or the historical processing information 44. The historical routing information 42 describes past destinations of the segment 18 as the segment travels via the network (such as the data network 36 and/or the communications network 38 shown in FIGS. 3 and 4). This historical routing information 42 could resemble a "travel log" for the segment 18. As the segment 18 is dispersed for any subsequent processing service, the historical routing information 42 would be updated with the destination address (such as an Internet Protocol address) of the subsequent processing service. The historical routing information 42 could also contain the routing/network path for that subsequent processing service. Even if no subsequent processing service is required, the historical routing information 42 could still be updated with any destination address and any routing/network path as the segment travels. The historical routing information 42, therefore, could contain any information that describes the routing of the segment 18 or the routing of the processing results for the segment 18.

FIG. 5 also shows the historical processing information 44. The historical processing information 44 resembles a "processing log" for the segment 18. As the segment 18 travels via the network from destination to destination, the historical processing information 44 describes any processing that is performed upon the segment 18. The historical processing information 44 could also describe each result obtained for each process; in other words, the historical processing information 44 could separately explain any processing performed on the segment and any processing performed on the results of that processing (the results are shown as reference numeral 24 in FIGS. 2 and 4). No matter how the segment 18 is processed (e.g., formatted, transformed, encrypted, scaled, compressed, or manipulated), the historical processing information 44 provides a log of that processing. As the segment 18 travels, and as the segment 18 is processed, the Analysis Module 20 annotates the segment 18 with a history of its travels and processing. The historical routing information 42 and the historical processing information 44 thus allows the Analysis Module 20 to inherently "mark-up" the segment 18 without assistance and with little or no oversight.

FIG. 5 shows the historical routing information 42 and the historical processing information 44 contained within a header 46. This header 46 is preferably separately identifiable from the packets 16 of data contained within the segment 18. The header 46 may be a separate packet, or the header 46 may be a data field within the segment 18. The header 46 serves as an annotation area for the entire segment 18. As the segment travels, and as the segment 18 is processed, the historical routing information 42 and the historical processing information 44 contained within the header 46 are updated. Although the segment 18 is shown with the header 46 leading the packets 16 of data, the header 46 may be situated at any location within the segment 18. The historical routing information 42 and the historical processing information 44, too, need not be contained within the header 46. The historical routing information 42 and the historical processing information 44 may be maintained within any portion, or at any location, of the segment 18.

Figure 6:
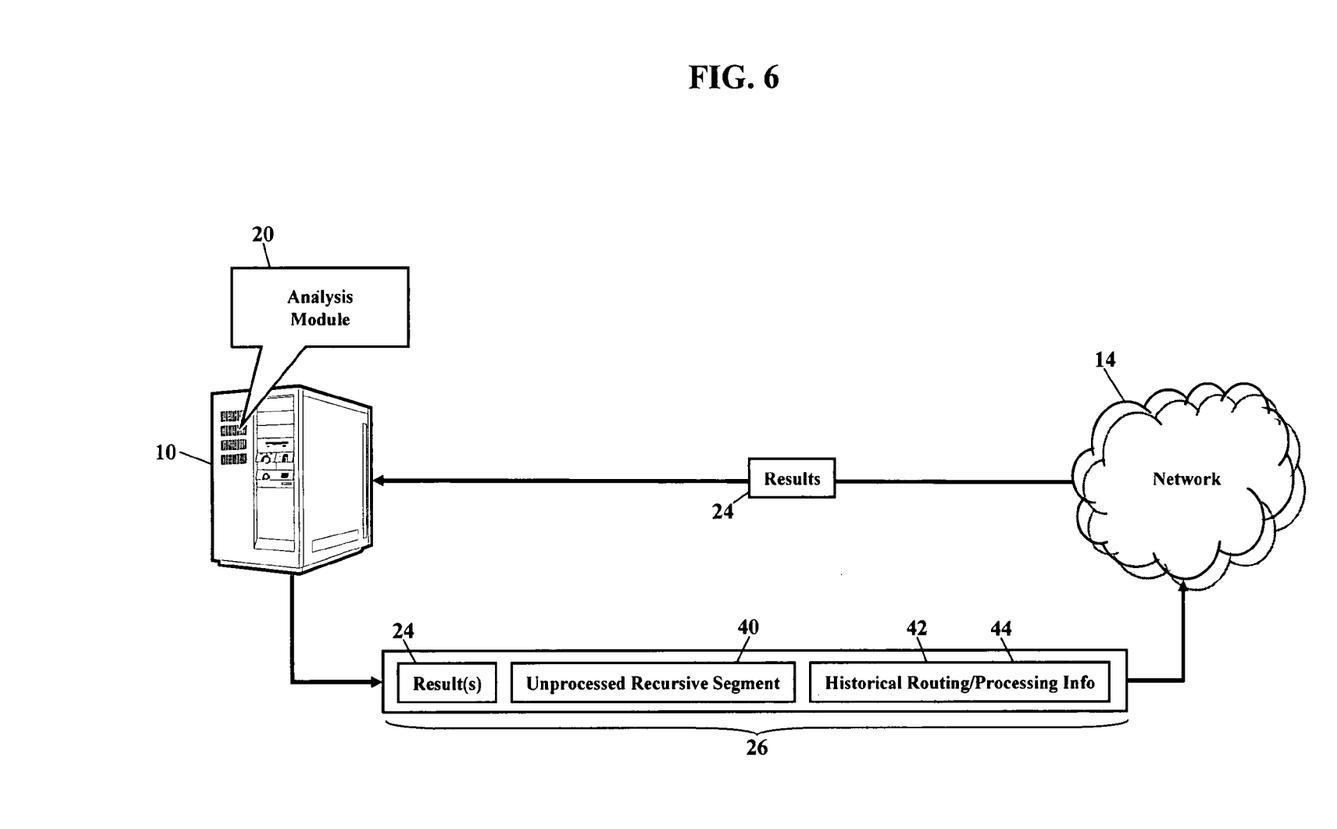

FIG. 6 is a schematic illustrating another of the embodiments of this invention. FIG. 6 is similar to FIG. 4 and again shows the Analysis Module 20 assembling the second data stream 26. Here, however, the Analysis Module 20 assembles the second data stream 26 using the historical routing information 42 and the historical processing information 44. The Analysis Module 20, as earlier mentioned, receives the results 24 of the subsequent processing services. The Analysis Module 20 may then aggregate/assemble the second data stream 26. The second data stream 26 includes at least one of i) the results 24 of the subsequent processing service and ii) the unprocessed, recursively segmented segment 40. The second data stream 26, however, may also include the historical routing information 42 and the historical processing information 44. The Analysis Module 20 may then communicate the second data stream 26 along the data network 36 and/or the communications network 38 to another computer device and/or a client communications device.

The Analysis Module 20 may employ a "self-assembly" strategy when assembling the second data stream 26. Because the Analysis Module 20 may identify recognizable characteristics of data, the Analysis Module 20 may use the same characteristics to autonomously assemble a requested stream of data. When, for example, a client communications device requests electronic data, the Analysis Module 20 can retrieve the requested electronic data and autonomously format that data to suit the client communications device. The Analysis Module 20 may also use any recognized characteristic to correctly assemble the requested data into the proper/required sequence. Because the Analysis Module 20 disperses the segments 18 for subsequent processing services (as FIGS. 1 and 3 show), the results (shown as reference numeral 24 in FIGS. 2 and 4) commonly randomly arrive in no particular order. The Analysis Module 20, then, must correctly assemble the second data stream 26 with the results 24, and with any unprocessed recursive segments 40, in a correct sequence or order. The Analysis Module 20, for example, could use chronological characteristics to determine the correct sequence or order of the second data stream 26. If the requested first data stream (shown as reference numeral 12 in FIG. 1) has a "first in, first out" arrangement, the Analysis Module 20 could arrange the second data stream 26 to chronologically correspond with the requested first data stream. The Analysis Module 20 could also use the historical routing information 42 and/or the historical processing information 44 to self-assemble the second data stream 26. The Analysis Module 20 could use the historical routing information 42 and the historical processing information 44 to inherently "mark-up" the segment 18 with assembly instructions.

Because this invention utilizes recursive segmentation, this invention is particularly useful for structured streams of data. The technique of recursive segmentation, as described herein, lends itself to fast and efficient data compression, data description, and data prediction. As data content formats become more structured, this invention allows automated segmentation, automated processing, and automated assembly of streams of data. The Analysis Module 20 of this invention creates and assembles formatted data streams for a client communications device. The client communications device may then view/execute/present the formatted data stream (such as the second data stream shown in FIGS. 2 and 4-6) with little or no regard for the original format of the requested electronic data. The formatted, second data stream 26 has already been substantially formatted, transformed, processed, and/or manipulated to suit the processing, storage, and/or audio/display requirements of the client communications device.

Figure 7:
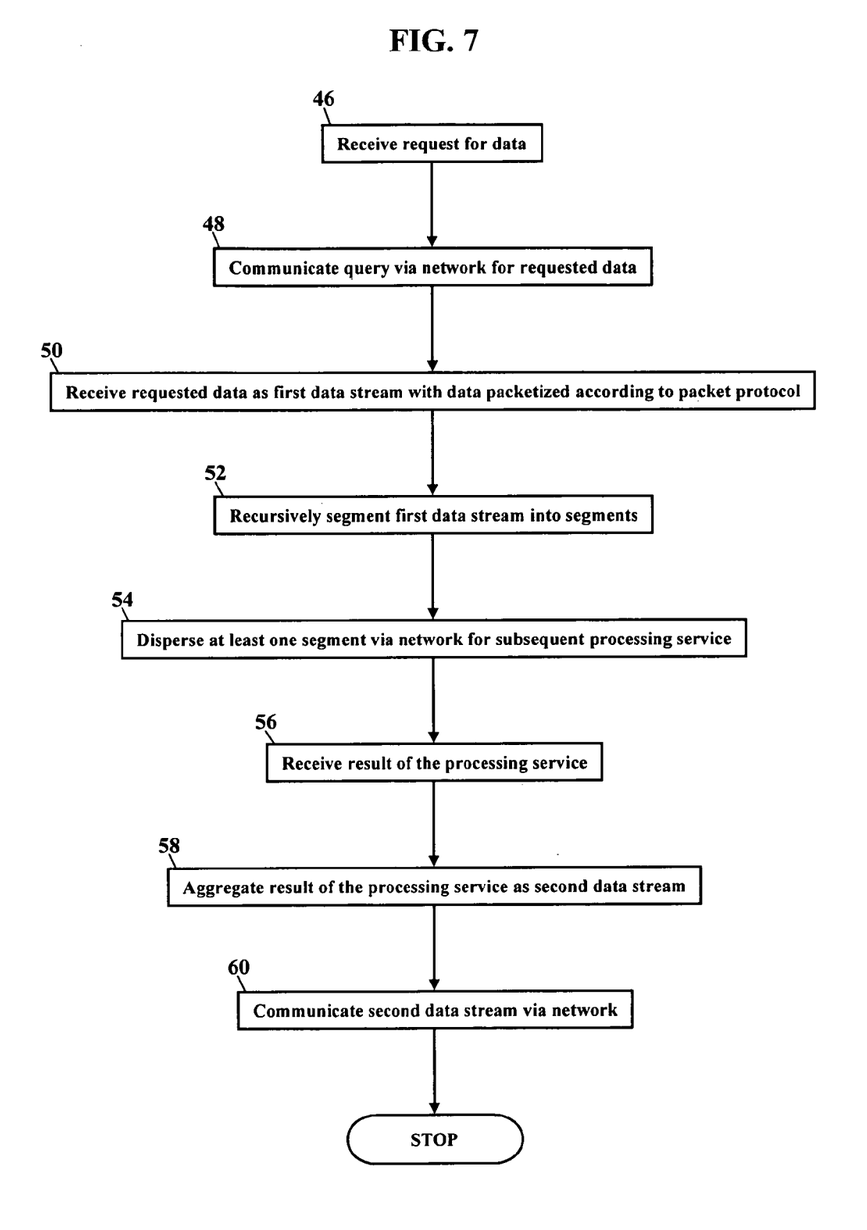
FIG. 7 is a flowchart illustrating a method of providing communications services according to the embodiments of this invention.

FIG. 7 is a flowchart illustrating a method of providing communications services. A request for data is received (Block 46). A query is communicated via a network for the requested data (Block 48). The requested data is received at a computer as a first data stream, and the first data stream is received as packets of data packetized according to a packet protocol (Block 50). The first data stream is recursively segmented into segments (Block 52), and at least one segment is dispersed via a network for a subsequent processing service (Block 54). A result of the processing service is received (Block 56) and aggregated into a second data stream (Block 58). The second data stream is then communicated via the network as the requested data (Block 60).

Figure 8:
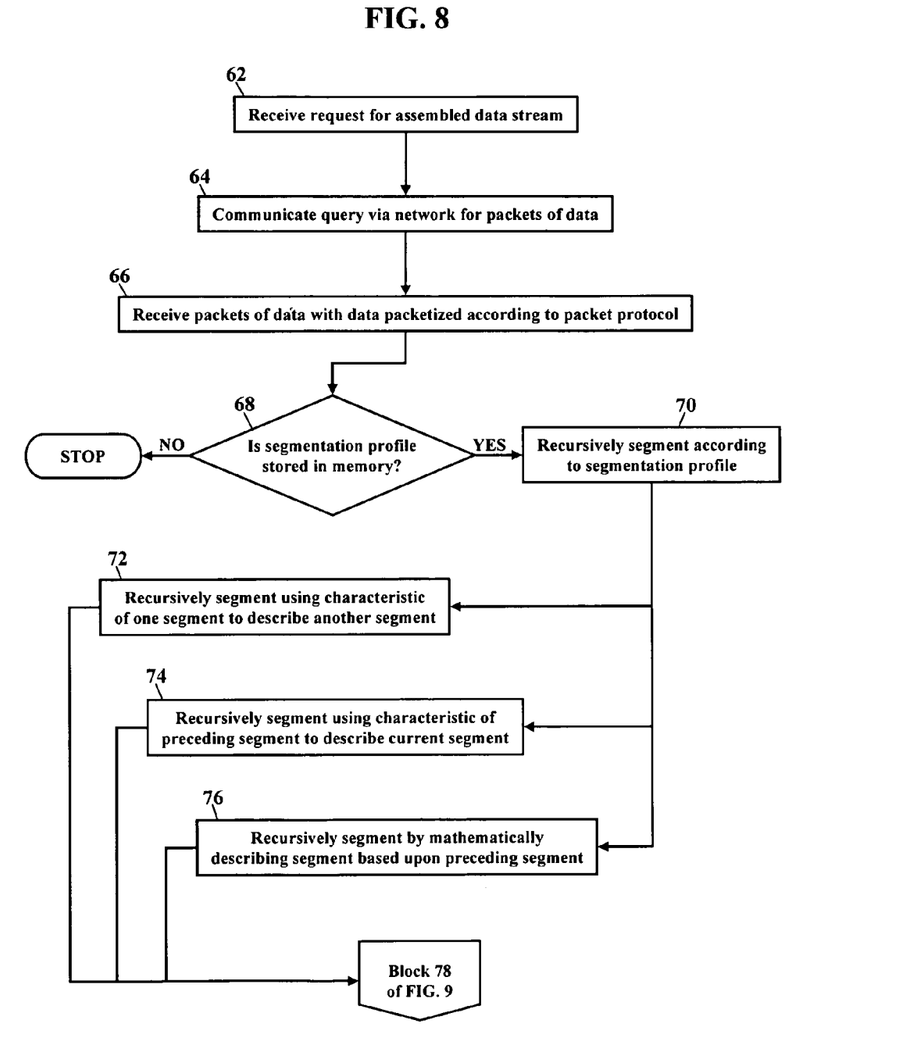
FIGS. 8 and 9 are flowcharts illustrating another method of providing communications services according to the embodiments of this invention.

FIGS. 8 and 9 are flowcharts illustrating one or more methods for providing communications services according to the embodiments of this invention. A request for an assembled data stream is received (Block 62), and a query is communicated via a network for packets of data fulfilling the request (Block 64). The packets of data are received at a computer operating in a network (Block 66). The packets of data are packetized according to a packet protocol. If a segmentation profile is stored in memory (Block 68), then the packets of data are recursively segmented according to the segmentation profile (Block 70). The packets of data may be recursively segmented using a characteristic of one segment to describe another segment (Block 72). The packets of data may also be recursively segmented using a characteristic of a preceding segment to describe a current segment (Block 74). The packets of data may also be recursively segmented by mathematically describing a segment based upon a preceding segment (Block 76).

The flowchart continues with FIG. 9. At least one of the segments is dispersed via the network for a subsequent processing service (Block 78). As the segment travels via the network, the segment may accrue historical routing information describing at least one destination of the segment (Block 80). As the segment is processed, the segment may accrue historical processing information describing at least one process performed on the segment (Block 82). A result of the subsequent processing service is received (Block 84). A data stream is then assembled (Block 86), and the data stream includes at least one of i) the results of the subsequent processing service, ii) a recursively segmented segment, iii) the historical routing information, and iv) the historical processing information. The assembled data stream may be communicated to a client communications device (Block 88).

The Analysis Module (shown as reference numeral 20 in FIGS. 1-6) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Analysis Module to be easily disseminated. A computer program product for providing communications services includes the Analysis Module stored on the computer-readable medium. The Analysis Module receives data at a computer with the data received as packets of data packetized according to a packet protocol. The Analysis Module recursively segments the packets of data into segments according to a segmentation profile stored in memory. The Analysis Module disperses at least one of the segments via a network for a subsequent processing service. The Analysis Module receives results of the subsequent processing service and assembles a data stream, with the data stream including at least one of i) the results of the subsequent processing service and ii) a recursively segmented segment.

The Analysis Module may also be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method, comprising:
   receiving, from a communications network, a data stream at a server of a network service provider, the data stream associated with a subscriber;
   observing a current sequence of data packets in the data stream has a similar structure to a previous sequence of data packets;
   recursively segmenting the data stream into segments, such that a characteristic of the previous sequence of data packets in the data stream determines how the current sequence of data packets is segmented;
   determining one of the segments requires a subcontracted processing service provided by a different service provider;
   grouping together the one of the segments with other segments from other subscribers that also require the subcontracted processing service provided by the different service provider;
   subcontracting grouped together segments from the server over the communications network to the different service provider to receive the subcontracted processing service;
   receiving, at the server, a result of the subcontracted processing service; and
   aggregating the result of the subcontracted processing service into the data stream.

2. The method according to claim 1, further comprising determining the subcontracted processing service is required from the different service provider.

3. The method according to claim 1, further comprising recursively segmenting the data stream.

4. The method according to claim 1, further comprising grouping together packets of data that require the subcontracted processing service.

5. The method according to claim 1, further comprising communicating the result of the subcontracted processing service to a destination.

6. The method according to claim 1, further comprising communicating the data stream to a destination.

7. The method according to claim 1, further comprising using a chronological characteristic of the preceding segment to describe the current segment.

8. The method according to claim 1, further comprising recognizing a repetitive segment and inserting a data compression result of a preceding segment to reduce processing of redundant segments.

9. The method according to claim 8, further comprising retrieving the data compression result of the preceding segment.

10. The method according to claim 1, further comprising dispersing a different segment for a different processing service.

11. The method according to claim 10, further comprising receiving a different result of the different processing service.

12. The method according to claim 11, further comprising aggregating the result of the subcontracted processing service and the different result of the different processing service into the subscriber data stream.

13. The method according to claim 1, further comprising replacing a complex segment with a common descriptor to produce an abbreviated annotation.

14. The method according to claim 1, further comprising:
   accruing routing information that describes a routing of the one of the segments and the subcontracted processing service; and
   assembling the data stream using the routing information.

15. A system, comprising:
   a processor; and
   memory storing code that when executed causes the processor to perform operations, the operations comprising:
      receiving, from a communications network, data streams from multiple subscribers requesting services from a service provider;
      observing a current sequence of data packets in one of the data streams has a similar structure to a previous sequence of data packets in another one of the data streams;
      recursively segmenting each of the data streams into segments, such that a characteristic of the previous sequence of data packets in the another one of the data streams determines how the current sequence of data packets is segmented;
      determining some of the segments require a subcontracted processing service provided by a different service provider;
      grouping together the some of the segments from the multiple subscribers that require the subcontracted processing service;
      subcontracting grouped-together segments over the communications network to the different service provider of another communications network to receive the subcontracted processing service;

receiving a result of the subcontracted processing service; and aggregating the result of the subcontracted processing service into a subscriber data stream for each subscriber of the multiple subscribers.

16. The system according to claim 15, wherein the operations further comprise recognizing a repetitive segment and inserting a data compression result of a preceding segment to reduce processing of redundant segments.

17. A computer readable memory storing computer-readable instructions that when executed by a processor cause the processor to perform operations, the operations comprising:

receiving data streams from multiple subscribers requesting services from a service provider of a communications network;

observing a current sequence of data packets in one of the data streams has a similar structure to a previous sequence of data packets in another one of the data streams;

recursively segmenting each of the data streams into segments, such that a characteristic of the previous sequence of data packets in the another one of the data streams determines how the current sequence of data packets is segmented;

determining some of the segments require a subcontracted processing service provided by a different service provider;

grouping together the some of the segments as a new segment that requires the subcontracted processing service;

subcontracting the new segment over a communications network to the different service provider of another communications network to receive the subcontracted processing service;

receiving a result of the subcontracted processing service; and aggregating the result of the subcontracted processing service into a subscriber data stream for each subscriber of the multiple subscribers.

18. The computer readable memory according to claim 17, wherein the operations further comprise recognizing a repetitive segment and inserting a data compression result of a preceding segment to reduce processing of redundant segments determining the subcontracted processing service is required from the different service provider.

* * * * *